United States Patent
Benthien et al.

(10) Patent No.: US 10,343,344 B2
(45) Date of Patent: Jul. 9, 2019

(54) CONNECTION SYSTEM, CONNECTION ARRANGEMENT AND METHOD

(71) Applicant: AIRBUS OPERATIONS GMBH, Hamburg (DE)

(72) Inventors: Hermann Benthien, Hamburg (DE); Matthias Hegenbart, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/486,949

(22) Filed: Apr. 13, 2017

(65) Prior Publication Data

US 2017/0297270 A1 Oct. 19, 2017

(30) Foreign Application Priority Data

Apr. 14, 2016 (DE) .................. 10 2016 206 296

(51) Int. Cl.
*B29C 65/54* (2006.01)
*B29C 65/00* (2006.01)
(Continued)

(52) U.S. Cl.
CPC .......... *B29C 65/548* (2013.01); *A44B 18/008* (2013.01); *B29C 65/48* (2013.01);
(Continued)

(58) Field of Classification Search
CPC ... B29C 65/548; B29C 66/3034; B29C 66/69; B29C 66/54; B29C 66/5268;
(Continued)

(56) References Cited

U.S. PATENT DOCUMENTS 4,239,829 A * 12/1980 Cohen ................. B32B 7/02
428/100
4,290,174 A * 9/1981 Kalleberg ......... A44B 18/0019
428/100
(Continued)

FOREIGN PATENT DOCUMENTS

| DE | 3341929 A1 | 5/1985 |
|---|---|---|
| DE | 102005006937 A1 | 8/2006 |
| DE | 102014215547 A1 | 2/2016 |

OTHER PUBLICATIONS

German Search Report for Application No. 102016206296 dated Mar. 28, 2017.

*Primary Examiner* — David Sample
*Assistant Examiner* — Donald M Flores, Jr.
(74) *Attorney, Agent, or Firm* — Jenkins, Wilson, Taylor & Hunt, P.A.

(57) ABSTRACT

A connection system has a first adhesion segment, on which a first connection region is formed, a second adhesion segment, on which a second connection region is formed, and a solidifiable liquid connection substance for connecting the two adhesion segments in a material fit, wherein at least one of the two connection regions is formed flexibly, such that, when the liquid connection substance is introduced between the two connection regions which are opposite one another in an assembly arrangement of the two adhesion segments, a material connection is formed between the two connection regions automatically as a result of the elasto-capillary effect via the liquid connection substance.

20 Claims, 3 Drawing Sheets

(51) Int. Cl.
*B29C 65/56* (2006.01)
*B29C 65/48* (2006.01)
*A44B 18/00* (2006.01)
*B64C 1/12* (2006.01)
*F16B 11/00* (2006.01)
*B29L 31/30* (2006.01)

(52) U.S. Cl.
CPC .......... *B29C 65/56* (2013.01); *B29C 66/1122* (2013.01); *B29C 66/1142* (2013.01); *B29C 66/3034* (2013.01); *B29C 66/30321* (2013.01); *B29C 66/30325* (2013.01); *B29C 66/5221* (2013.01); *B29C 66/5268* (2013.01); *B29C 66/54* (2013.01); *B29C 66/69* (2013.01); *B64C 1/12* (2013.01); *F16B 11/006* (2013.01); *A44B 18/00* (2013.01); *A44B 18/0003* (2013.01); *A44B 18/0007* (2013.01); *A44B 18/0011* (2013.01); *A44B 18/0015* (2013.01); *A44B 18/0019* (2013.01); *A44B 18/0038* (2013.01); *A44B 18/0042* (2013.01); *A44B 18/0046* (2013.01); *A44B 18/0049* (2013.01); *A44B 18/0053* (2013.01); *A44B 18/0057* (2013.01); *A44B 18/0061* (2013.01); *A44B 18/0065* (2013.01); *B29C 66/43* (2013.01); *B29C 66/474* (2013.01); *B29C 66/5261* (2013.01); *B29C 66/7212* (2013.01); *B29L 2031/3076* (2013.01); *Y10T 428/24017* (2015.01)

(58) Field of Classification Search
CPC ..... B29C 65/56; B29C 66/5221; B29C 65/48; B29C 66/30321; B29C 66/1142; B29C 66/1122; B29C 66/30325; B29C 66/43; B29C 66/5261; B29C 66/7212; B29C 66/474; B64C 1/12; F16B 11/006; B29L 2031/3076; B29K 2307/04; Y10T 428/24017; Y10T 428/24008; A44B 18/00; A44B 18/0003; A44B 18/0015; A44B 18/0019; A44B 18/0038; A44B 18/0042; A44B 18/0046; A44B 18/0049; A44B 18/0053; A44B 18/0057; A44B 18/0061; A44B 18/0065; A44B 18/008; A44B 18/0088; A44B 18/0011; A44B 18/0007
USPC .... 428/100, 99; 24/442, 448, 444, 445, 450, 24/451, 452
See application file for complete search history.

(56) References Cited

U.S. PATENT DOCUMENTS

| | | | | |
|---|---|---|---|---|
| 5,868,987 | A * | 2/1999 | Kampfer | A44B 18/0061 24/450 |
| 5,871,604 | A * | 2/1999 | Hohman | B29C 70/081 428/300.7 |
| 6,248,276 | B1 * | 6/2001 | Parellada | A44B 18/0049 264/167 |
| 6,592,800 | B1 * | 7/2003 | Levitt | A44B 18/0049 264/167 |
| 8,291,554 | B2 * | 10/2012 | Duer | B01D 29/093 24/559 |
| 8,756,769 | B2 * | 6/2014 | Benthien | B64C 1/406 428/100 |
| 8,784,722 | B2 * | 7/2014 | Rocha | B29C 59/04 264/444 |
| 2011/0265292 | A1 * | 11/2011 | Kirby | A44B 18/0053 24/451 |
| 2016/0037921 | A1 | 2/2016 | Benthien et al. | |

\* cited by examiner

CONNECTION SYSTEM, CONNECTION ARRANGEMENT AND METHOD

CROSS-REFERENCE TO RELATED APPLICATION

This application claims priority to German Patent Application DE 10 2016 206 296.4 filed Apr. 14, 2016, the entire disclosure of which is incorporated by reference herein.

TECHNICAL FIELD

The present disclosure relates to a connection system, to a connection arrangement and to a method for connecting components in a material fit. In particular, the present disclosure deals with connecting structures of an aircraft or spacecraft in a material fit.

Although it is usable in various applications for connecting a wide range of components, the present disclosure and the problems on which it is based are described in greater detail in relation to fastening aircraft components to one another.

BACKGROUND

Modern aircraft comprise a multiplicity of components which need to be fixed to one another by couplings or in predefined positions on the aircraft structure by appropriate fastening or holding devices. So as to provide the highly complex technical infrastructure of modern aircraft, it is usually necessary to apply many thousands of different couplings and holders.

Even in modern aircraft, conventional connection techniques such as weld, rivet or screw connections or the like are still often relied upon. For example, metal components, for example structural components such as formers or stringers, are often riveted together via coupling brackets made of metal or fiber composite material or the like. However, conventional fastening elements such as metal bolts, rivets or screws contribute considerably to an increase in weight of the relevant structure. Further, assembly is expensive and complex in this case. As a result of the geometric configuration, it is sometimes not possible to join two components directly at the ideal geometric connection points, lines or faces, but only via coupling elements which couple the components to one another from the outside.

By contrast, adhesive connections of components provide simplified assembly. In addition, in many application scenarios, weight can be saved by adhesive components by comparison with purely mechanical connections. However, conventional adhesive connections are limited, since only relatively low adhesion forces act between the planar adhesion faces which are typically glued in this context. Contaminations in the glue used can additionally reduce the maximum achievable adhesion.

SUMMARY

Against this background, one idea of the present disclosure is to provide a lightweight adhesive connection which is particularly simple to assemble and which makes stable, secure fastening of structures to one another possible.

Accordingly, in one embodiment a connection system is provided. The connection system comprises a first adhesion segment on which a first connection region is formed. The connection system further comprises a second adhesion segment, on which a second connection region is formed. The connection system further comprises a solidifiable liquid connection substance for connecting the two adhesion segments in a material fit. At least one of the two connection regions is formed flexibly, in such a way that, when the liquid connection substance is introduced between the two connection regions which are opposite one another in an assembly arrangement of the two adhesion segments, a material connection is formed between the two connection regions automatically as a result of the elastocapillary effect via the liquid connection substance.

In another embodiment, a connection arrangement is provided. The connection arrangement comprises a first adhesion segment, on which a first connection region is formed. The connection arrangement further comprises a second adhesion segment, on which a second connection region is formed. At least one of the two connection regions is formed flexibly, in such a way that, when the liquid connection substance is introduced between the two connection regions which are opposite one another in an assembly arrangement of the two adhesion segments, a material connection is formed between the two connection regions automatically as a result of the elastocapillary effect via the liquid connection substance. The two connection regions are interconnected in a material fit via the connection substance introduced between the two connection regions.

In another embodiment, an aircraft or spacecraft is provided. The aircraft or spacecraft comprises a connection arrangement of the disclosure herein.

In another embodiment, a method for connecting a first adhesion segment to a second adhesion segment in a material fit is provided. The method comprises the step of arranging an assembly arrangement of the two adhesion segments. A first connection region of the first adhesion segment is arranged opposite a second connection region of the second adhesion segment. At least one of the two connection regions is formed flexibly. The method further comprises the step of introducing a solidifiable liquid connection substance between the two connection regions. The method further comprises the step of wetting the two connection regions with the liquid connection substance, in such a way that the liquid connection substance automatically forms a material connection between the two connection regions as a result of the elastocapillary effect. The method further comprises the step of solidifying the liquid connection substance.

An idea underlying the present disclosure is to implement an adhesive connection between adhesion segments on the basis of a multiple load path design, which makes it possible to form connections even in connection regions of components which can only be accessed with difficulty. For this purpose, the solution according to the disclosure herein provides that a material adhesive connection between connection regions is established as a result of a connection substance in that at least one of the two connection regions is deformed by the connection substance. After the connection regions are wetted with the connection substance, it merely remains to solidify the connection substance so as to establish a material connection between the two adhesion segments. The material connection according to the disclosure herein forms to some extent of its own accord. For example, the connection regions may be deformed in such a way that a positive connection is established between the connection regions.

For this purpose, the present disclosure makes use of the elastocapillary effect. Elastocapillarity refers to the possibility of deforming resilient components by wetting them with liquids. The relevant components are buckled or deformed as a result of the capillary forces acting between the liquid and the wetted surface or wetted component. Although these forces are in principle relatively small, a component can nevertheless be formed in such a way, for example with appropriately thin and flexible structures or regions, for example wall structures or walls, that when wetted with an appropriate liquid the component is resiliently deformed by the capillary forces between the liquid and the wetted surface of the component.

One particular feature of the disclosure herein is that no expensive or heavy additional means, such as screws, nuts, bolts, washers and so on, are required so as to fasten two components to one another. Since the required holes and so on are thus also superfluous, internal stresses are also avoided automatically to some extent. Further, however, an adhesive connection is established which has a much higher load capacity at the same contact area than for example adhesive connections in which two planar, closed faces are glued to one another. The deformation of one or both connection regions improves the load capacity of the connection. Since in the solution according to the disclosure herein mechanical fastening elements such as screws or rivets either can be omitted completely or at least are required in a lower number, the connection system according to the disclosure herein can be made much more weight-efficient, depending on the application, and this in turn saves on fuel and costs.

A further feature of the disclosure herein occurs in relation to assembly, which in the present system can be carried out in a particularly flexible, simple and rapid manner without expensive additional aids. The two adhesion segments merely have to be positioned in such a way that the two connection regions are correspondingly opposite. Subsequently, the connection substance is introduced in such a way that the two connection regions are wetted with the connection substance at least in portions. The flexibly formed connection region is now pulled and/or twisted and/or deformed with respect to the opposing connection region as a result of the elastocapillary effect from the connection substance. If both connection regions are formed flexibly, the two connection regions accordingly move towards one another. In this context, the connection substance is further distributed between the two connection regions, and this in turn reinforces the elastocapillary effect, in such a way that ultimately it is possible to connect the two connection regions in a manner in which the two connection regions are covered with connection substance. Once the connection substance is cured, a material connection of the two connection regions is thus established as a result.

A flexible connection region within the meaning of the disclosure herein is formed flexibly in such a way that the capillary forces occurring during the elastocapillary effect are sufficiently large to twist the connection region to establish the connection. Flexible within the meaning of the disclosure herein includes among other things resiliently flexible connection regions, but in particular also plastically deformable connection regions, which are merely plastically deformed once as a result of the occurring capillary forces. Different configurations of the solution according to the disclosure herein will suggest themselves to a person skilled in the art depending on the application. Thus for example an adhesion segment made of a thermoplastic or a corresponding material which is reversibly deformable by application of temperature may be provided. For example, before assembly of the connection arrangement according to the disclosure herein, a connection region may be deformed by application of temperature into an assembly orientation or configuration which is cured after the subsequent cooling. In this form, the connection region is now wetted with the connection substance and twisted or deformed as a result of the capillary forces. In this context, it may for example be provided that the connection region is ultimately brought back into the initial form thereof which it possessed before the application of temperature. In other configurations, it may for example be provided that the adhesion segment or connection region is manufactured in an assembly orientation or assembly configuration directly by an additive process, in other words a 3D printing process, the orientation or configuration not for example having to be resiliently deformable, but merely being plastically deformed once when the connection arrangement is formed.

In principle, a connection region according to the disclosure herein may further be formed in such a way that and/or be made of or comprise a material such that it absorbs the connection substance when wetted. In addition, the connection region may be formed in such a way that it expands upon absorbing the connection substance. For example, a connection region may comprise a super-absorbent polymer or a similar material which can expand to many times the original volume thereof by absorbing liquid. Further, a connection region may for example be provided with receiving openings which extend in the manner of capillaries through the relevant connection region into the interior of the relevant adhesion segment. The receiving openings may be formed in such a way that the receiving openings receive the liquid connection substance as a result of capillary ascension when the liquid connection substance is applied to the relevant connection region. Thus, in this case the receiving openings may be configured in the manner of capillaries, in such a way that when the relevant connection region is wetted with the liquid connection substance the material rises into the receiving openings as a result of the adhesive forces acting between the connection substance and the connection region. This "capillary ascension" is one possible form of the physical capillary effect. The inside face of the receiving openings is therefore wetted with connection substance, and the effective gluing area is increased by this proportion. How high or deep the connection substance rises into the receiving openings is dependent on various factors, such as the materials and substances used (for example density, viscosity, porosity etc.) and the capillary geometry, in particular the diameter and cross-sectional area of the receiving openings. Depending on the desired effect and application, particular constraints on the capillarity should be met, and the materials should be selected and possibly also pretreated accordingly. In these developments, the effective gluing or adhesive area is thus increased many times over by comparison with conventional planar gluing faces.

In a development of the connection system, the connection between the two connection regions may form a positive fit.

In a development of the disclosure herein, the first connection region may be formed with a multiplicity of first meshing elements and the second connection region may be formed with a multiplicity of second meshing elements. The second meshing elements may be configured to engage in the first meshing elements to form a meshing between the two connection regions. At least one of the two connection regions may accordingly be formed flexibly in such a way that, when the liquid connection substance is introduced between the two connection regions which are opposite one another in an assembly arrangement of the two adhesion segments, a material meshing is formed between the two connection regions automatically as a result of the elastocapillary effect via the liquid connection substance. Accordingly, in a development of the connection arrangement, the two connection regions may be meshed together in a material fit via the connection substance introduced between the two connection regions. In a development, the method comprises arranging the first connection region of the first adhesion segment comprising a multiplicity of first meshing elements opposite the second connection region of the second adhesion segment comprising a multiplicity of second meshing elements. As a result of introducing the connection substance between the two connection regions and wetting the two connection regions with the liquid connection substance, the substance automatically forms a material meshing between the two connection regions as a result of the elastocapillary effect. In this development of the disclosure herein, the material adhesive connection is supplemented with a meshing. On the one hand, the meshing elements of the connection regions engage in one another. On the other hand, this meshing is additionally glued by the connection substance. After the connection regions mesh, it merely remains to solidify the connection substance so as to establish a material connection between the two adhesion segments.

In a development of the connection system, the second meshing elements may be formed to mesh positively with the first meshing elements. For example, the first meshing elements may be formed as teeth which are shaped and arranged in a complementary manner to the second meshing elements, which are also formed as teeth. In an alternative embodiment, the first meshing elements may for example be formed as pins, whilst the second meshing elements are formed as journals between which there are gaps for receiving the pins.

In a development of the connection system, both connection regions may be formed flexibly. Accordingly, in this development, both connection regions deform as a result of the elastocapillary effect of the introduced connection substance. In principle, however, the two connection regions may have different flexural properties, for example different moduli of elasticity.

In a development of the connection system, the liquid connection substance may be a glue and/or a synthetic resin or the like.

In a development of the connection system, the meshing elements may be formed as teeth, journals, ribs, webs and/or pins or the like.

In a development of the connection system, the adhesion segments may substantially consist of or comprise plastics material and/or a fiber-reinforced plastics material. For example, the adhesion segments may be formed of a carbon-fiber-reinforced plastics material. The use of plastics material has the major advantage that weight and costs can be reduced. For components made of carbon-fiber-reinforced plastics materials, a connection arrangement according to the disclosure herein may also already be established during the production process of the components. For example, the components may be prepregs or the like, in other words semi-finished products made of carbon fibers, which are embedded in an uncured synthetic resin matrix. Prepregs of this type are typically used for manufacturing various components of modern aircraft or spacecraft. Usually, the prepregs are initially brought into shape and subsequently "baked" in an autoclave, in other words the plastics material matrix is cured by applying pressure and temperature. A connection arrangement according to the disclosure herein may for example interconnect two prepregs of this type or fix further components thereto. In particular, in this way adhesion segments according to the disclosure herein can be connected integrally to structural components of an aircraft or spacecraft. The synthetic resin may in this case serve as a connection substance. The relevant connection is solidified in a subsequent autoclaving process. In this case, the connection arrangement is advantageously already established during the production of the structural components. On the other hand, at least the adhesion segments may already be integrally connected to structural components during production. Building on this, the adhesion segments according to the present disclosure may also not be connected in a material fit until a subsequent, separate step.

Accordingly, a development of the method may also provide synthetic resin as a solidifiable liquid connection substance. In this development, the step of solidifying may comprise the curing by an autoclave. In this development, the adhesion segments could be fixed to one another or for example to prepregs before the components are cured in an autoclave.

In a development of the connection system, the adhesion segments may be formed as single pieces. For example, the adhesion segments may be manufactured from plastics material or fiber-reinforced plastics material by an additive layer manufacturing process (3D printing) or the like. This has the advantage that even complex configurations can be manufactured in a simple yet precise manner.

The above embodiments and developments may be combined with one another as desired, within reason. Further possible embodiments, developments and implementations of the disclosure herein also comprise combinations not explicitly mentioned of features of the disclosure herein which are disclosed above or in the following in relation to the embodiments. In particular, in this context a person skilled in the art will also add individual aspects to the relevant basic form of the present disclosure as improvements or additions.

BRIEF DESCRIPTION OF THE DRAWINGS

In the following, the present disclosure is described in greater detail by way of the embodiments shown in the schematic drawings, in which.

Figure 1A:
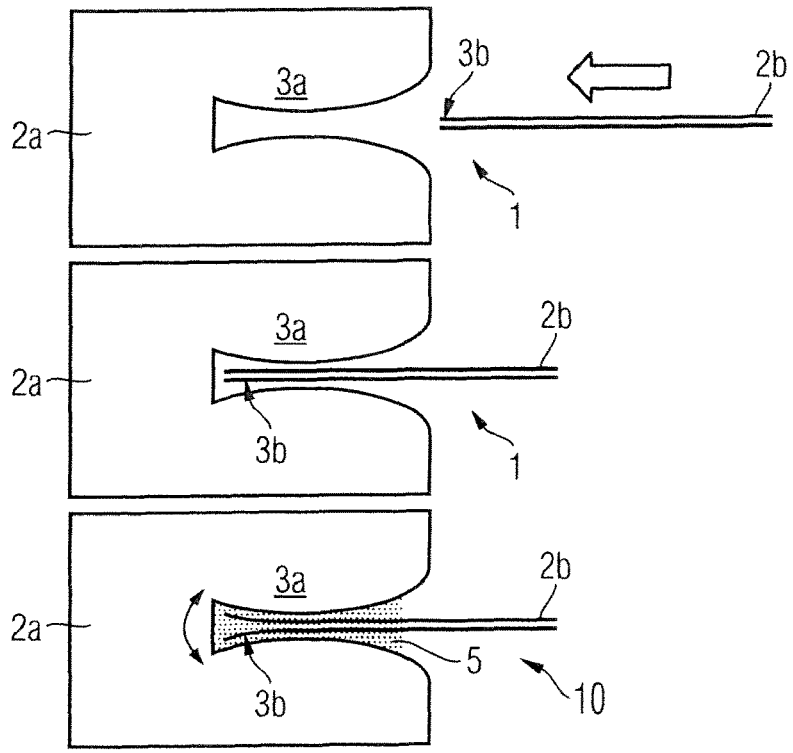
FIG. 1a gives schematic cross-sectional views of the assembly of a connection arrangement according to the disclosure herein comprising a connection system according to the disclosure herein in accordance with an embodiment of the disclosure herein.

The accompanying drawings are intended to convey further understanding of the embodiments of the disclosure herein. They illustrate embodiments and serve, in connection with the description, to explain principles and concepts of the disclosure herein. Other embodiments and many of the stated advantages may be derived from the drawings. The elements of the drawings are not necessarily shown to scale with one another.

In the drawings, unless stated otherwise, like, functionally equivalent and equivalently acting elements, features and components are provided with like reference numerals in each case.

DETAILED DESCRIPTION

Figure 1B:
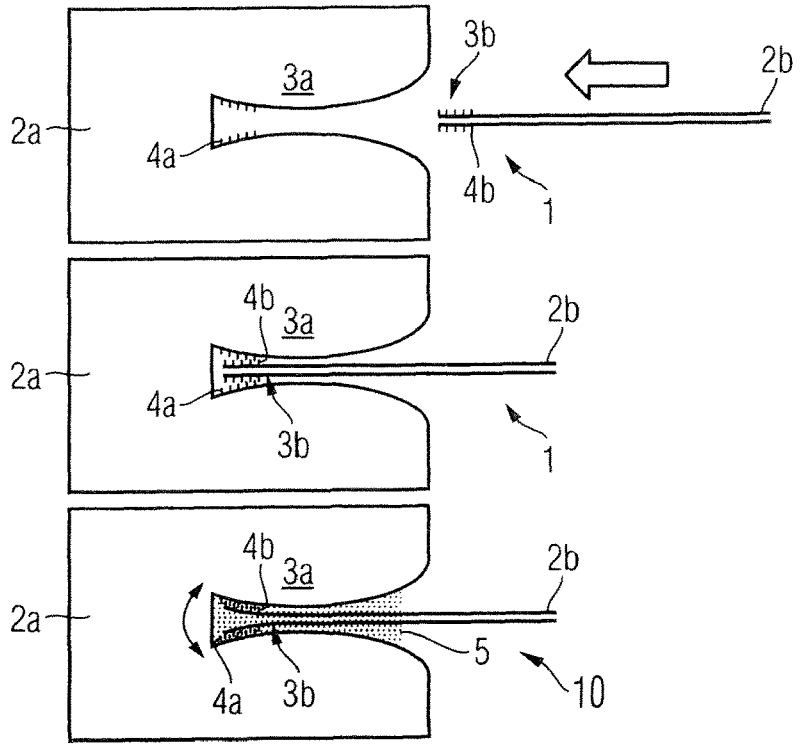
FIG. 1b gives schematic cross-sectional views of the assembly of a connection arrangement according to the disclosure herein comprising a connection system according to the disclosure herein in accordance with a further embodiment of the disclosure herein.
Figure 1C:
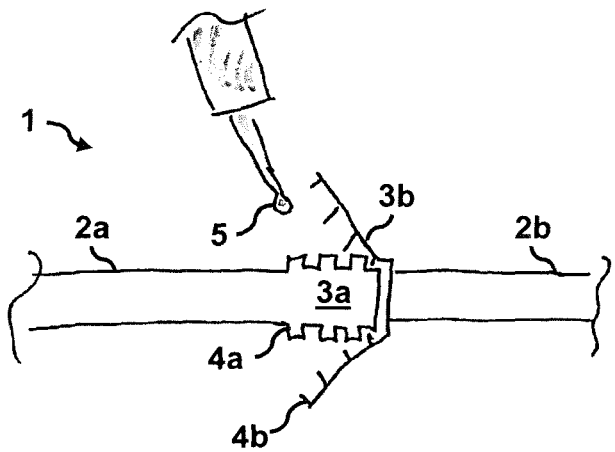
FIG. 1c gives schematic cross-sectional views of the assembly of a connection arrangement according to the disclosure herein comprising a connection system according to the disclosure herein in accordance with a further embodiment of the disclosure herein.
Figure 1C:
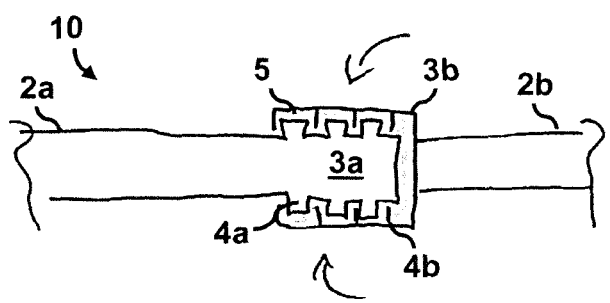

FIG. 1a through 1c give schematic cross-sectional views of the assembly of connection arrangements according to the disclosure herein comprising connection systems according to the disclosure herein in accordance with embodiments of the disclosure herein.

Figure 2:
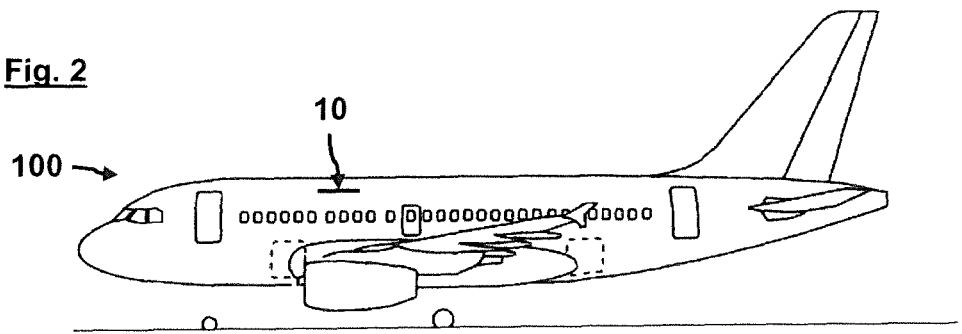
FIG. 2 is a schematic side view of an aircraft comprising the connection arrangement of FIG. 1a, 1b or 1c.

Each connection system 1 is formed to fasten a first adhesion segment 2a and a second adhesion segment 2b to one another. An adhesion segment 2a, 2b of this type may for example be part of a component or of a structure of an aircraft or spacecraft 100, such as is shown in FIG. 2. A structure of this type may for example be a former, a former segment, a stringer or the like or a coupling element for connecting a plurality of these or similar components. For example, the described adhesion segment 2a may be used in connecting former segments if other fastening options such as holes or screw and rivet connections are not acceptable or desired. Alternatively, an adhesion segment 2a, 2b of this type may also be a separate component which is for example to be fastened within the aircraft or spacecraft 100, for example to a structure of the aircraft or spacecraft 100. The component may be a line, a cable, a pipe, a tube or the like. The structure may for example be a primary structure of an aircraft. In principle, all embodiments described in the following of the connection system 1 according to the disclosure herein may, with appropriate adaptations, be used for any other aircraft or spacecraft, other vehicles, for example motor vehicles, water vehicles etc., and further different fields of application.

In the embodiments of the connection system 1 in FIG. 1a through 1c, the first adhesion segment 2a comprises a first connection region 3a and the second adhesion segment 2b comprises a second connection region 3b. Especially in the embodiments in FIGS. 1a and 1b, the first connection region 3a may for example be formed as a round or slot-shaped receiving opening (the receiving opening extending into or out of the plane of the drawing in the latter case), whilst the second connection region 3b may for example be a portion of a fiber-like (or rod-like) or planar, plate-shaped adhesion segment 2b. In the embodiment of FIG. 1b, the first adhesion segment 2a further comprises a first connection region 3a, which is formed with a multiplicity of first meshing elements 4a. Accordingly, in FIG. 1b the second adhesion segment 2b comprises a second connection region 3b comprising a multiplicity of second meshing elements 4b. In this case, the second meshing elements 4b are formed as pins, like the first meshing elements 4a, in such a way that they can engage in the first meshing elements 4a to form meshing between the two connection regions 3a, 3b. Likewise, in the embodiment of FIG. 1c the first adhesion segment 2a comprises a first connection region 3a, which is formed with a multiplicity of first meshing elements 4a. In this embodiment, the first meshing elements 4a are formed as teeth or ribs. For example, the first adhesion segment 2a may be formed cylindrical in FIG. 1a, for example with a circular cross section, the first meshing elements 4a being formed as peripheral ribs. The first connection region 3a forms a portion of the outer cylinder surface in this case. In another example, the first adhesion segment 2a may be formed as a rod having a rectangular profile, rectangular ribs being formed on one or more side faces of the first adhesion segment 2a as first meshing elements 4a. In this case, these side faces correspond to the first connection region 3a. In principle, however, the meshing elements 4a may generally be formed as teeth, journals, ribs, webs and/or pins or the like, and the first adhesion segment 2a or the first connection region 3a may have various geometries. In FIG. 1c, the second adhesion segment 2b comprises a second connection region 3b comprising a multiplicity of second meshing elements 4b. In this context, the second meshing elements 4b are configured to engage in the first meshing elements 4a to form a meshing between the two connection regions 3a, 3b. In the embodiment shown in FIG. 1c, the second meshing elements 4b are pin-shaped elements which are attached to the second connection region 3b protruding laterally from the second adhesion segment 2b. If the first connection region 3a is for example formed as a cylinder outer surface, the second connection region 3b may have the basic shape of a frustum, in other words the second connection region 3b has a surface corresponding to the outer surface of a frustum or a surface corresponding to sub-portions of the outer surface of a frustum (cf. for example FIG. 4a). In another example, if the first connection region 3a is formed as one or more side faces of a rectangular rod, the second connection region 3b may comprise corresponding rectangular surface pieces to which the second meshing elements 4b are attached. Various other embodiments are provided as an alternative to the embodiment shown. For example, like the first meshing elements 4a, the second meshing elements 4b may also be formed as teeth or ribs, which are accordingly arranged and/or shaped in a complementary manner to the first meshing elements 4a (cf. FIG. 4b). A person skilled in the art will provide configurations of the connection regions 3a, 3b and meshing elements 4a, 4b according to the disclosure herein accordingly in accordance with the requirements of the relevant application.

In the embodiments in FIG. 1a through 1c, the second connection region 3b is formed flexibly, in such a way that by bending the second connection region 3b towards the first connection region 3a a connection, in particular a positive connection, can be formed between the first connection region 3a and the second connection region 3b. In FIGS. 1b and 1c, in particular a meshing between the first meshing elements 4a and the second meshing elements 4b is formed in this context. For example, the adhesion segments 2a, 2b and in particular the first connection region 3a and the second connection region 3b may substantially consist of or comprise plastics material and/or a fiber-reinforced plastics material, for example a carbon-fiber-reinforced plastics material. The adhesion segments 2a, 2b may for example consist completely of plastics material, and have been manufactured as a single component by an additive layer manufacturing process (3D printing). Three-dimensional printing processes of this type can be used very flexibly, including for manufacturing complex plastics material objects and/or metal components. In 3D-printing processes, various geometric configurations of the adhesion segments 2a, 2b can be implemented without high complexity (for example those shown in FIG. 4a-c).

Figure 3:
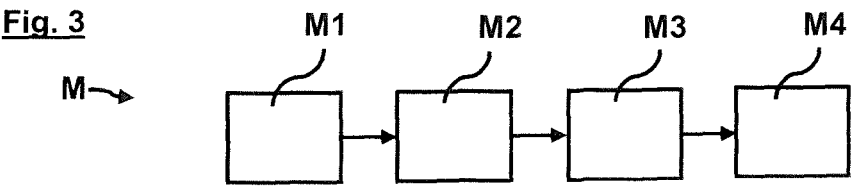
FIG. 3 is a schematic flow chart of a method according to the disclosure herein for assembling the connection arrangement of FIG. 1a, 1b or 1c.

The connection system 1 further provides a solidifiable liquid connection substance 5 for connecting the adhesion segments 2a, 2b in a material fit, for example a glue or a synthetic resin or the like. The individual method steps of a corresponding method M for connecting the adhesion segments 2a, 2b in a material fit are shown schematically in FIG. 3, and are described in the following with reference to FIG. 3 and FIG. 1a through 1c. FIG. 1a through 1c each show at the bottom a connection arrangement 10 which has been formed by a method M of this type on the basis of the relevant connection system 1.

At M1, the method M comprises the step of arranging an assembly arrangement of the two adhesion segments 2a, 2b. In this context, the first connection region 3a of the first adhesion segment 2a is arranged opposite the second connection region 3b of the second adhesion segment 2b (see FIG. 1a through 1c). In the embodiments of FIGS. 1a and 1b, the second adhesion segment 2b is introduced into the first adhesion segment 2a at the second connection region 3b for this purpose. At M2, the method further comprises the step of introducing the solidifiable liquid connection substance 5 between the two connection regions 3a, 3b (see FIGS. 1a to 1c). At M3, the wetting of the two connection regions 3a, 3b (at least in portions) with the liquid connection substance 5 is shown. The second connection region 3b is formed flexibly, in such a way that the liquid connection substance 5 automatically forms a material connection between the two connection regions 3a, 3b as a result of the elastocapillary effect (indicated by arrows). In the configurations in FIGS. 1b and 1c, in particular a material meshing is formed in this context. In this context, the flexibly formed second connection region 3b is bent towards the first connection region 3a as a result of the capillary forces between the connection substance 5 and the portions wetted therewith of the connection regions 3a, 3b, in such a way that a meshing of the two connection regions 3a, 3b is formed. If the connection substance 5 merely wets the connection regions 3a, 3b in portions, the connection substance 5 is further distributed between the two connection regions 3a, 3b as a result of the two connection regions 3a, 3b being pressed together, and this in turn reinforces the elastocapillary effect. Finally, at M4, the method M comprises the step of solidifying the liquid connection substance 5 to form a connection arrangement 10 in which the two connection regions 3a, 3b are interconnected or meshed together in a material fit via the connection substance 5 introduced between the two connection regions 3a, 3b.

FIG. 1a through 1c and the other drawings are to be interpreted purely schematically. Thus, in particular, the deformations and arrangements of the resiliently twistable connection regions 3b are shown greatly exaggerated for illustrative purposes. Deformations due to the elastocapillary effect are typically very small, in many cases in the microscopic range. The shown formation of the resiliently deformable connection region or regions 3b is also to be understood within this meaning.

The connection arrangement 10 closes automatically to some extent as a result of the elastocapillary effect, and is therefore particularly simple and advantageous, for example for applications in which large structures are to be interconnected in a positive fit and the connection points, lines or faces are not directly accessible or only accessible in a complicated manner by conventional methods. The connection arrangement 10 formed in this manner thus represents an advantageous combination of two connection concepts which supplement one another. Thus, a glue connection is combined with an automatically formed positive fit and depending on the configuration an additional meshing in a multiple load path approach. This has the advantage over conventional adhesive connections that in addition, to the underlying material connection, deformed connection regions 3a, 3b or meshing elements 4a, 4b of the connection regions 3a, 3b hook into one another and thus promote the connection. On the one hand, this has the advantage that a particularly lightweight connection of two components is provided, since screws, nuts, bolts etc. are not necessarily required. On the other hand, an adhesive connection is further provided which has a much higher load capacity at the same contact area than for example adhesive connections in which two planar, closed faces are glued to one another.

Figure 4A:
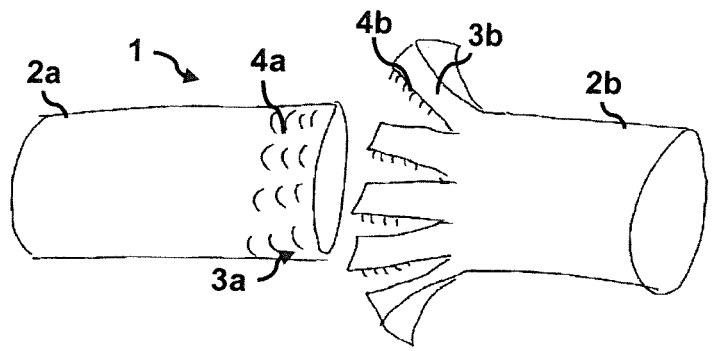
FIG. 4a-4c are schematic views of connection arrangements in accordance with further embodiments of the disclosure herein.
Figure 4A:
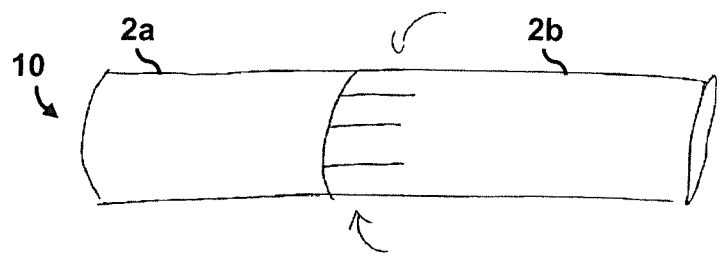
Figure 4B:
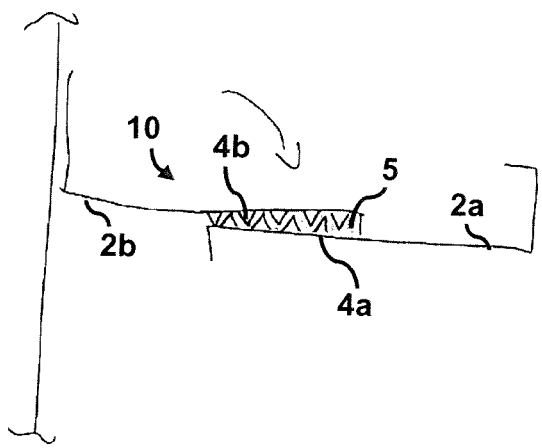
Figure 4C:
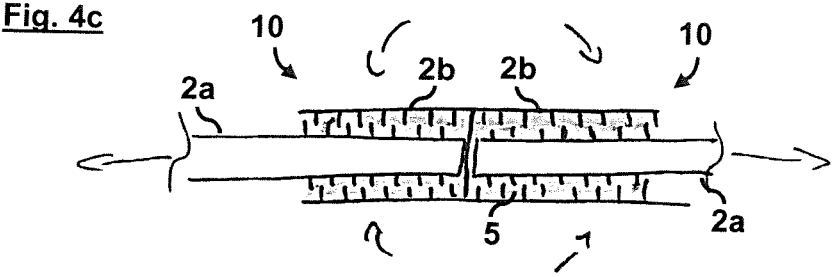

FIG. 4a-c show example alternative embodiments of connection arrangements 10 according to the disclosure herein. The illustrated arrows in each case indicate in what direction the resiliently formed connection region moves as a result of the capillary forces of the elastocapillary effect, in other words in what direction the connection is automatically formed. FIG. 4a is a perspective view of a connection system 1 and a connection arrangement 10 comprising cylindrical adhesion segments 2a, 2b. FIG. 4b shows an example of a connection arrangement comprising meshing elements 4a, 4b which are formed as teeth arranged and shaped in a complementary manner, in such a way that a positive meshing is formed. Finally, FIG. 4c shows an example of a combination of two connection arrangements 10 according to the disclosure herein, in which each coupling element comprises two second adhesion segments 2b, which are each connected to a first adhesion segment 2a of a further component, in such a way that as a result coupling between these components is achieved.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection system, comprising:
   a first adhesion segment, on which a first connection region is formed;
   a second adhesion segment, on which a second connection region is formed; and
   a solidifiable liquid connection substance for connecting the two adhesion segments in a material fit,
   wherein at least one of the two connection regions is formed flexibly, such that, when the liquid connection substance is introduced between the two connection regions which are opposite one another in an assembly arrangement of the two adhesion segments, the at least one flexible connection region deforms and the two connection regions automatically connect as a result of an elastocapillary effect of the liquid connection substance, and wherein a material connection is formed between the two connection regions upon curing of the liquid connection substance.

2. The connection system of claim 1, wherein the material connection forms a positive fit between the two connection regions.

3. The connection system of claim 1, wherein the first connection region is formed with a multiplicity of first meshing elements and the second connection region is formed with a multiplicity of second meshing elements,
wherein the second meshing elements are configured to engage in the first meshing elements to form a material meshing between the two connection regions, and
wherein at least one of the two connection regions is accordingly formed flexibly such that, when the liquid connection substance is introduced between the two connection regions which are opposite one another in an assembly arrangement of the two adhesion segments, the material meshing is formed between the two connection regions automatically as a result of the elastocapillary effect of the liquid connection substance.

4. The connection system of claim 3, wherein the second meshing elements are formed for positive meshing with the first meshing elements.

5. The connection system of claim 1, wherein both connection regions are formed flexibly.

6. The connection system of claim 1, wherein the liquid connection substance is a glue.

7. The connection system of claim 1, wherein the liquid connection substance is a synthetic resin.

8. The connection system of claim 1, wherein the first and/or second meshing elements are formed as teeth.

9. The connection system of claim 1, wherein the first and/or second meshing elements are formed as journals.

10. The connection system of claim 1, wherein the first and/or second meshing elements are formed as ribs.

11. The connection system of claim 1, wherein the first and/or second meshing elements are formed as webs.

12. The connection system of claim 1, wherein the first and/or second meshing elements are formed as pins.

13. The connection system of claim 1, wherein the adhesion segments substantially consist of plastics material.

14. The connection system of claim 1, wherein the adhesion segments substantially consist of a fiber-reinforced plastics material.

15. The connection system of claim 1, wherein the first and second adhesion segments are formed together in a single additive manufacturing process.

16. A connection arrangement, comprising:
a first adhesion segment, on which a first connection region is formed;
and a second adhesion segment, on which a second connection region is formed;
wherein at least one of the two connection regions is formed flexibly, such that, when a liquid connection substance is introduced between the two connection regions which are opposite one another in an assembly arrangement of the two adhesion segments, the at least one flexible connection region deforms and the two connection regions connect automatically as a result of an elastocapillary effect of the liquid connection substance,
wherein a material connection is formed between the two connection regions upon curing of the liquid connection substance, and
wherein the two connection regions are interconnected in a material fit via the connection substance introduced between the two connection regions.

17. The connection arrangement of claim 16,
wherein the first connection region is formed with a multiplicity of first meshing elements and the second connection region is formed with a multiplicity of second meshing elements,
wherein the second meshing elements are configured to engage in the first meshing elements to form a material meshing between the two connection regions,
wherein at least one of the two connection regions is formed flexibly, such that, when the liquid connection substance is introduced between the two connection regions which are opposite one another in an assembly arrangement of the two adhesion segments, the material meshing is formed between the two connection regions automatically as a result of the elastocapillary effect of the liquid connection substance, and
wherein the two connection regions are meshed together in a material fit via the connection substance introduced between the two connection regions.

18. An aircraft or spacecraft comprising a connection arrangement comprising:
a first adhesion segment, on which a first connection region is formed;
and a second adhesion segment, on which a second connection region is formed;
wherein at least one of the two connection regions is formed flexibly, such that, when a liquid connection substance is introduced between the two connection regions which are opposite one another in an assembly arrangement of the two adhesion segments, the at least one flexible connection region deforms and the two connection regions automatically connect as a result of an elastocapillary effect of the liquid connection substance, and
wherein a material connection is formed between the two connection regions upon curing of the liquid connection substance, and
wherein the two connection regions are interconnected in a material fit via the connection substance introduced between the two connection regions.

19. A method for connecting a first adhesion segment to a second adhesion segment in a material fit, comprising:
arranging an assembly arrangement of the two adhesion segments, wherein a first connection region of the first adhesion segment is arranged opposite a second connection region of the second adhesion segment, and wherein at least one of the two connection regions is configured flexibly;
introducing a solidifiable liquid connection substance between the two connection regions;
wetting the two connection regions with the liquid connection substance, such that the at least one flexible connection region deforms and the two connection regions connect automatically as a result of an elastocapillary effect; and
solidifying the liquid connection substance to form a material connection.

20. The method of claim 19,
wherein the first connection region of the first adhesion segment comprising a multiplicity of first meshing elements is arranged opposite the second meshing region of the second adhesion segment comprising a multiplicity of second meshing elements, wherein the second meshing elements are configured to engage in the first meshing elements to form a material meshing between the two connection regions, and wherein the liquid connection substance forms the material meshing between the two connection regions automatically as a result of the elastocapillary effect.

* * * * *